United States Patent
Gouteyron et al.

(10) Patent No.: US 12,539,263 B2
(45) Date of Patent: Feb. 3, 2026

(54) DEODORANT COMPOSITION CONTAINING 1-PARA-MENTHEN-8-THIOL, 3-MERCAPTOHEXYL ACETATE AND UNDECYLENIC ACID OR THE DERIVATIVES THEREOF

(71) Applicant: JAFER ENTERPRISES R&D SL, Granollers (ES)

(72) Inventors: Antoine Gouteyron, Le Cannet (FR); Marion Perez, Le Cannet (FR); Chloé Charier, Antibes (FR); Thomas Delmas, Antibes (FR)

(73) Assignee: JAFER ENTERPRISES R&D SL, Barcelona (ES)

( * ) Notice: Subject to any disclaimer, the term of this patent is extended or adjusted under 35 U.S.C. 154(b) by 599 days.

(21) Appl. No.: 17/798,341

(22) PCT Filed: Feb. 9, 2021

(86) PCT No.: PCT/EP2021/053091
§ 371 (c)(1),
(2) Date: Aug. 9, 2022

(87) PCT Pub. No.: WO2021/160613
PCT Pub. Date: Aug. 19, 2021

(65) Prior Publication Data
US 2023/0051391 A1    Feb. 16, 2023

(30) Foreign Application Priority Data

Feb. 10, 2020  (FR) ..................... 2001264

(51) Int. Cl.
| | | |
|---|---|---|
| *A61K 8/46* | (2006.01) | |
| *A61K 8/02* | (2006.01) | |
| *A61K 8/36* | (2006.01) | |
| *A61K 8/37* | (2006.01) | |
| *A61K 8/9783* | (2017.01) | |
| *A61L 9/00* | (2006.01) | |
| *A61Q 15/00* | (2006.01) | |

(52) U.S. Cl.
CPC .............. *A61K 8/46* (2013.01); *A61K 8/0216* (2013.01); *A61K 8/361* (2013.01); *A61K 8/37* (2013.01); *A61K 8/9783* (2017.08); *A61L 9/00* (2013.01); *A61Q 15/00* (2013.01)

(58) Field of Classification Search
CPC ...... A61K 8/46; A61K 8/9783; A61K 8/0216; A61K 8/361; A61K 8/37; A61Q 15/00
See application file for complete search history.

(56) References Cited

U.S. PATENT DOCUMENTS

| | | |
|---|---|---|
| 11,319,506 B2 | 5/2022 | Delmas et al. |
| 2011/0300095 A1 | 12/2011 | Dente et al. |
| 2014/0093471 A1* | 4/2014 | Porter ...................... A61L 9/01 |
| | | 424/76.1 |

FOREIGN PATENT DOCUMENTS

WO    WO 2018/167206    9/2018

OTHER PUBLICATIONS

WO 2018/167206 A1 Description Translated. Delmas, T. Sep. 20, 2018. (Year: 2018).*
National Center for Biotechnology Information (2025). PubChem Compound Summary for CID 518810, 3-Mercaptohexyl acetate. Retrieved Jan. 10, 2025 from https://pubchem.ncbi.nlm.nih.gov/compound/3-Mercaptohexyl-acetate. (Year: 2025).*
Written Opinion in International Application No. PCT/EP2021/053091, May 14, 2021, pp. 1-6.

* cited by examiner

*Primary Examiner* — Mina Haghighatian
*Assistant Examiner* — Susannah S Armstrong
(74) *Attorney, Agent, or Firm* — SALIWANCHIK, LLOYD & EISENSCHENK

(57) ABSTRACT

The present disclosure relates to a deodorising composition containing: (a) 1-para-menthen-8-thiol, (b) 3-mercaptohexyl acetate and (c) undecylenic acid or a derivative thereof. It also relates to the use of the disclosed composition for eliminating bad odours, and to a deodorant product in the form of an aerosol, a candle or a perfume diffuser that has a wick or a stick or is electric. Also provided is an article consisting of a solid polymeric material, in particular a silicone elastomer, containing the disclosed composition.

11 Claims, No Drawings

DEODORANT COMPOSITION CONTAINING 1-PARA-MENTHEN-8-THIOL, 3-MERCAPTOHEXYL ACETATE AND UNDECYLENIC ACID OR THE DERIVATIVES THEREOF

CROSS-REFERENCE TO RELATED APPLICATION

This application is the U.S. national stage application of International Patent Application No. PCT/EP2021/053091, filed Feb. 9, 2021.

SUBJECT OF THE INVENTION

The present invention relates to a deodorizing composition containing: (a) 1-para-menthen-8-thiol, (b) 3-mercaptohexyl acetate and (c) undecylenic acid or one of its derivatives. It also relates to the use of this composition for eliminating unpleasant odors, and also to a deodorizing product in the form of an aerosol, a candle, a wick, reed or electrical fragrance diffuser, or an article consisting of a solid polymer material, notably of a silicone elastomer, containing the abovementioned composition.

BACKGROUND OF THE INVENTION

Numerous products capable of reducing or masking unpleasant odors are commercially available and have been described in the literature. These deodorizing products act either physically, by trapping the molecules responsible for the unpleasant odors in filters having a suitable porosity and specific surface area, notably cyclodextrins, or physiochemically, by reducing the volatility of the malodorous compounds, or else sensorially, by masking the unpleasant odors using fragrances which make it possible to reduce the perception thereof. Among the latter, the applicant has already proposed using the combination of 1-para-menthen-8-thiol or thioterpineol with 3-mercaptohexyl acetate, which is notably present in certain plant extracts and in particular in a volatile composition extracted from *Zanthoxylum armatum* (WO 2018/167206).

The applicant has thus envisaged the use of these extracts as odor-masking agents in various deodorizing products.

Although these extracts have proved very effective in masking odors of diverse origins, it has become apparent that these odors could be eliminated more rapidly by combining the constituents of these extracts undecylenic acid or derivatives thereof. The applicant has in fact observed that this combination made it possible not only to mask unpleasant odors, but also to limit the diffusion thereof into the atmosphere and therefore to neutralize them.

The use of undecylenic acid or a derivative thereof as a deodorizing agent has already been described in several documents, notably U.S. Pat. Nos. 5,976,460; 5,275,783; 5,338,511; and 5,439,641. However, to the knowledge of the applicant, it has not yet been suggested to combine it with combination of 1-para-menthen-8-thiol and 3-mercaptohexyl acetate, or with a plant extract containing this combination. Furthermore, it could not be predicted that undecylenic acid or derivatives thereof would make it possible to improve the efficacy of the abovementioned combination, all the more so synergistically, insofar as it is well known that the mixing of deodorizing molecules may have an effect which is antagonistic to that obtained when these molecules are used individually.

SUMMARY OF THE INVENTION

Thus, one subject of the invention is a deodorizing composition containing: (a) 1-para-menthen-8-thiol (b) 3-mercaptohexyl acetate and (c) undecylenic acid or one of its derivatives.

Another subject of the invention is the use of this composition for eliminating unpleasant odors.

A further subject of the invention is a deodorizing product in the form of an aerosol, a candle, a wick, reed or electrical fragrance diffuser, or an article consisting of a solid polymer material, notably of a silicone elastomer, containing the abovementioned composition.

DETAILED DESCRIPTION

The invention relates to a novel composition suitable for eliminating unpleasant odors, which makes it possible notably to effectively prevent their diffusion into the atmosphere. This composition comprises precisely three particular constituents, namely (a) 1-para-menthen-8-thiol, (b) 3-mercaptohexyl acetate and (c) undecylenic acid or a derivative thereof.

The abovementioned constituents (a) and (b) can be introduced individually into the composition or be provided by one or more plant extracts which contain them in the natural state. According to one embodiment, the composition according to the invention therefore contains a plant extract or a mixture of plant extracts, such as an extract of timur (*Zanthoxylum armatum*). This is a plant that grows in Asia and in particular in Nepal, the berries of which constitute timut pepper. The extract used according to the invention can be obtained from any part of timur and in particular the leaves thereof, the trunk thereof, the fruit (berries) thereof or the pericarp of said berries. More preferentially, use is made of an extract of timur berries.

In one preferred mode of implementation of this embodiment of the invention, the timur berries may be dried and/or ground by any means prior to the extraction thereof, notably by cryogenic grinding. Indeed, it has been observed that the ground berries had a better balance between their different olfactory notes, due in particular to a modification of the monoterpenes/linalool ratio. The mean particle size distribution (D50) of the ground berries may notably be between 200 and 600 µm, as measured by screening.

In the case where it contains an extract of timur, the composition according to the invention advantageously also contains at least one other constituent naturally present in such an extract and which may be chosen from: linalool, limonene, myrcene, methyl cinnamate, β-phellandrene, 4-mercapto-4-methylpentan-2-one, 3-mercaptohexanol and a mixture thereof, preferably a mixture of all the abovementioned constituents. According to one embodiment of the invention, this extract contains from 5% to 99% of volatile and semi-volatile products which contain from 50% to 95% by weight of a combination of linalool, limonene, myrcene and methyl cinnamate. A "volatile product" is understood to mean a product having a vapor pressure of less than 13.34 Pa (0.1 mmHg) at 20° C. or a boiling point below 216° C. A "semi-volatile product" is understood to mean a product having a boiling point between 216° C. and 350° C.

Since the compounds (a) and (b) used according to the invention are also present separately in plant extracts other than those derived from timur, the composition according to the invention may, as a variant, contain a mixture of plant extracts, for example a mixture of an extract of black grape, of passion fruit or of hops (containing 3-mercaptohexyl acetate) and of grapefruit, of trifoliate orange (*Poncirus trifoliata*) or of orange (containing 1-para-menthen-8-thiol).

The extraction of the plant parts chosen to obtain the plant extract(s) used according to the invention may be carried out by hydrodistillation or preferentially using supercritical $CO_2$. In the case of timur, supercritical $CO_2$ extraction makes it possible to obtain an extract having a fragrance which is more potent, more long-lasting and less rich in aldehydes than extraction by hydrodistillation. These characteristics could be associated with the greater richness in fatty acids and in esters of the volatile fraction obtained in this way. The conditions for carrying out these processes will be able to be readily determined by those skilled in the art. Thus, the extraction with supercritical $CO_2$ may for example be carried out at a temperature of 30° C. to 60° C., for example of 35° C. to 50° C., under a pressure of 50 to 150 bar, for example of 80 to 100 bar. The plant extract obtained may optionally be dried by any means, generally to a moisture content of 0 to 10% by weight, before being used according to the invention.

The presence of 1-para-menthen-8-thiol and 3-mercaptohexyl acetate in the plant extract can be confirmed notably by modification of these thiols with 4,4'-dithiodipyridine or N-phenylmaleimide, respectively, then analysis by ultra-high-performance liquid chromatography (UHPLC) coupled with qualitative and quantitative analysis by mass spectrometry (QqQ MS).

The composition according to the invention contains example from 100 to 10 000 ppm, preferably from 600 to 6000 ppm, of 1-para-menthen-8-thiol and generally from 100 to 10 000 ppm, preferably from 400 to 4000 ppm of 3-mercaptohexyl acetate.

Another essential constituent of the composition according to the invention is undecylenic acid or a derivative thereof. The derivatives of undecylenic acid may advantageously be chosen from: an alkyl ester of undecylenic acid, in particular a substituted or unsubstituted, linear or branched $C_1$-$C_{12}$ alkyl ester, such as a methyl, ethyl, propyl, hexyl or decyl ester; an ester of polyoxyalkylenic acid, notably a polyoxyethylene, polyoxypropylene or poly (oxyethylene) (oxypropylene) ester of undecylenic acid, preferably to containing from 2 to 20 polyoxyalkylene units; a salt of undecylenic acid, in particular a metal salt, such as the sodium, potassium, magnesium, calcium, zinc or copper salts or, as a variant, an ammonium salt of undecylenic acid; and mixtures thereof.

It is preferred according to the invention to use an alkyl ester of undecylenic acid, in particular methyl undecylenate.

The composition according to the invention contains for example from 0.001% to 10% by weight, preferably from 0.01% to 5% by weight and more preferentially from 0.1% to 1% by weight, of undecylenic acid or a derivative thereof.

The composition according to the invention may be used to eliminate any type of unpleasant odors, i.e. to remove the olfactory perception thereof, in particular by limiting their diffusion into the air. These unpleasant odors may notably be chosen from indole odors, amine (in particular ammonia and skatole) odors, thiol (notably dimethyl trisulfide or thiogeraniol) odors or acid (notably isovaleric acid) odors.

The composition according to the invention may furthermore be used to reduce these odors in any type of environment in which it is applied, notably to the body or in domestic, commercial or industrial premises. As a variant, this composition may be combined with products which themselves have an unpleasant odor or which are liable to generate unpleasant odors during their use.

In a first mode of implementation, the composition according to the invention constitutes an additive added to a detergent product such as a laundry detergent or a household cleaner (notably a product for cleaning toilets or dishes); to a body hygiene product such as a deodorant, an antiperspirant, a soap or a shampoo; or to a hair dye product, without this list being limiting. These products may notably be in the form of liquid, gel, foam or cream or else in solid form. According to one particular embodiment of this mode of implementation, the detergent product may be impregnated on a nonwoven product, notably a wipe.

The composition according to the invention may be conveyed in microspheres, nanocapsules, microcapsules, liposomes or any other vector enabling the incorporation thereof in the abovementioned products and optionally the sustained release of its constituents. A preferred example of microcapsules suitable for this effect consists of the microcapsules described in document FR 3 069 252. They contain an oily core comprising the composition according to the invention, said core being coated with a first membrane obtained from at least one polymer which is preferably chosen aminoplast resins, preferably urea-formaldehyde or melamine-formaldehyde or melamine-urea-formaldehyde resins, and polyureas. The outer surface of the first membrane is covered with a second membrane, which essentially consists of at least one water-insoluble non-silicone compound, having a melting point between 20° C. and 120° C. This compound is advantageously chosen from salts of stearic acid and ricinoleic acid, preferentially magnesium stearate or zinc ricinoleate, more preferentially magnesium stearate.

In a second mode of implementation, the composition according to the invention is used in the manufacture of a deodorizing product, which may notably be in the form of an aerosol, a candle, a wick, reed or electrical fragrance diffuser, or an article consisting of a solid polymer material, notably of a silicone elastomer. This product is in particular intended to be used as an interior and/or textile deodorizer. The composition may in this case comprise different constituents making it possible in particular for the product containing it to be in a form suited to its use. These constituents may for example comprise solvents such as water and/or hydrocarbon-based or silicone polar or nonpolar organic solvents; surfactants; aqueous phase gelling agents; oily phase thickeners; preservatives; antioxidants; chelating agents; polyols; odor absorbers such as zeolites, cyclodextrins, silica, aluminosilicates or activated carbon; UV absorbers; antimicrobial agents; fragrances such as essential oils; pigments; and dyes, without this list being limiting, as long as these constituents do not adversely affect the deodorizing properties of the composition according to the invention.

In one particular embodiment of this mode of implementation, the composition containing the three constituents described previously may be impregnated in an article consisting of a solid polymer material, generally of a silicone elastomer, as described in document WO 2019/137894. In this case, the composition further contains a solvent comprising a $C_{10}$-$C_{18}$ monoester of a $C_1$-$C_8$ alkyl, preferably a $C_{12}$-$C_{16}$ monoester of a $C_3$-$C_6$ alkyl, such as isopropyl myristate, advantageously combined with a saturated $C_2$-$C_{10}$ diester of a $C_3$-$C_{12}$ alkyl, preferably a saturated $C_4$-$C_8$ diester of a $C_6$-$C_{10}$ alkyl, more preferentially dioctyl adipate, in order to improve the degree of infusion of the deodorizing composition in the material and the diffusion profile thereof. The article obtained may for example be in the form of a ring, a pebble, a ball, a cube, a cylinder, a dome or a pyramid suitable for being laid down or hung up with a view to deodorizing the atmosphere or being introduced into the drum of a washing machine.

In another embodiment, the deodorizing composition according to the invention may be incorporated into an absorbent article, such as a baby's diaper, and in particular into the absorbent core and/or at least one of the nonwoven layers and/or plastic films constituting the upper and lower layers of the absorbent product and/or within elastic bands.

EXAMPLES

The invention will be better understood in light of the following examples which are given purely by way of illustration and the aim of which is not to limit the scope of the invention, defined by the appended claims.

Example 1: Deodorization Test on Cotton

An unpleasant odor reducer (UOR) was prepared, consisting of a mixture of:
1-para-menthen-8-thiol
3-mercaptohexyl acetate
methyl undecylenate.

For this purpose, 1-para-menthen-8-thiol (1,8-PMT) and 3-mercaptohexyl acetate (3-HMA) were first diluted separately to 0.00001% by weight in dipropylene glycol, then the two solutions were mixed in a 1,8-PMT:3-HMA weight ratio of 61:39 and everything was diluted to 0.005% by weight in ethanol. A mixture referred to as SSPS was thus obtained. For its part, the methyl undecylenate (MUD) was diluted to 1% by weight in ethanol. The SSPS and MUD mixture was then mixed in an SSPS:MUD weight ratio of 20:80.

The test consisted in evaluating the deodorizing ability of the following unpleasant odor reducers (UOR):SSPS, MUD, MUD+SSPS.

For this purpose, various unpleasant odors (ammonia, thiogeraniol, dimethyl trisulfide) were injected into sealed 15 ml glass bottles, into which one (or two for ammonia) squares of cotton were placed. The olfactory intensity of the unpleasant odor (UO) was evaluated by trained panellists after 2 h 30 mins of equilibration and the average of the results was calculated.

The percentage reduction in unpleasant odor is given in Table 1 below for a certain amount of UOR vs. UO in a bottle comprising only the unpleasant odor.

In this table:
nSSPS/nUO=Concentration in moles of SSPS divided by the concentration of the unpleasant odor diluted to 0.0025 mol·L$^{-1}$ in ethanol.
nMUD/nUO=Concentration in moles of methyl undecylenate diluted to 1% in ethanol divided by the concentration in moles of the unpleasant odor diluted in ethanol.
nMUD+SSPS/nUO SSPS=Concentration in moles of the MUD+SSPS mixture divided by the concentration of the unpleasant odor diluted in ethanol.

TABLE 1

| UOR | Aqueous ammonia | nUOR/ nUO | Thio- geraniol | nUOR/ nUO | Dimethyl trisulfide | nUOR/ nUO |
|---|---|---|---|---|---|---|
| MUD | 30% | 160 | 11% | 180 | 56% | 180 |
| SSPS | 25% | 0.8 | 33% | 0.6 | 13% | 0.6 |
| MUD + SSPS | 100% | | 100% | | 100% | |

As it emerges from this table, the constituents of the composition according to the invention make it possible to eliminate the unpleasant odors synergistically.

Example 2: Deodorizing Products

The following formulations were prepared in a conventional manner for a person skilled in the art, by mixing the ingredients below in the weight proportions indicated. In each of these formulae, the fragrance contained 1% by weight of a mixture of 1-para-menthen-8-thiol (1,8-PMT) and 3-mercaptohexyl acetate (3-HMA) diluted to 0.00001% by weight in dipropylene glycol, in a 1,8-PMT:3-HMA weight ratio of 61:39. The methyl undecylenate was used pure.

TABLE 2

| CONSTITUENT | INCI | weight % |
|---|---|---|
| FORMULA FOR A SPRAY | | |
| ETHANOL | Ethanol | 91.75% |
| METHYL UNDECYLENATE | Methyl undecylenate | 0.25% |
| FRAGRANCE | / | 1.00% |
| FORMULA FOR A CANDLE | | |
| WAX | / | 95.75% |
| METHYL UNDECYLENATE | Methyl undecylenate | 0.25% |
| FRAGRANCE | / | 4.00% |
| FORMULA FOR A REED DIFFUSER | | |
| SOLVENT | Dipropylene Glycol Methyl Ether | 91.75% |
| METHYL UNDECYLENATE | Methyl undecylenate | 0.25% |
| FRAGRANCE | / | 8.00% |

Microcapsules

Microcapsules were prepared comprising the deodorizing composition according to the invention, as described in patent FR 3 069 252.

For this purpose, an oil-in-water emulsion was prepared by mixing, in order, 32.6 g of water, 15.65 g of surfactant (10% solution) consisting of a poly(methyl vinyl ether-co-maleic anhydride) copolymer sold by ASHLAND INC. under the trade name GANTREZ® AN-119 BF, 32.6 g of the fragrance containing 1,8-PMT and 3-HMA, 1.8 g of methyl undecylenate and 7.3 g of melamine-formaldehyde prepolymer supplied by SYRIATOS SA under the trade name WF-70®. The mixing is carried out under vigorous stirring (7500 rpm) for 10 minutes at 70-80° C. The stirring was decreased to 600 rpm and continued for 3 h at 90° C. to form the wall of the microcapsules. Still under stirring, 0.32 g of magnesium stearate in the melt state (at 95-100° C.) were then added to the suspension. The stirring was continued for 30 min, then the suspension was cooled to ambient temperature in order to crystallize the magnesium stearate around the microcapsules. 0.85 g of a second surfactant (PEG-100 stearate) was added to the suspension, which was neutralized with 2.7 g of a 30 wt % aqueous solution of triethanolamine. 3.5 g of a formaldehyde scavenger, consisting of ethylene urea, were then added to the suspension.

Thus, an aqueous suspension of fragrance microcapsules with a two-layer structure was thus obtained, which microcapsules may be incorporated into a detergent, cosmetic or pharmaceutical composition or into textile materials, paper or cardboard, preferably into a detergent composition.

Silicone Pebble

In accordance with the teaching of application WO 2019/137894, an 8.2 g piece of silicone was submerged for 6 h in a solution consisting of 7.5% by weight of methyl undecylenate, 74% by weight of the fragrance/SSPS (99:1) mixture described in example 1 above and 18.5% by weight of a solution consisting of 50% by weight of isopropyl myristate and 50% by weight of dioctyl adipate, in order to obtain a material consisting of 0.5% by weight of methyl undecylenate, 5.2% by weight of fragrance, 0.65% by weight of isopropyl myristate, 0.65% by weight of dioctyl adipate and 93% by weight of silicone.

The impregnated piece of silicone thus obtained may be used as a pebble to be placed in a wardrobe in order to deodorize laundry.

The above formulations, used under standard conditions, make it possible to limit, or even prevent, the diffusion of unpleasant odors present in the ambient air.

Example 3: Demonstration of the Deodorizing Effect Under Real Conditions

Several deodorizing devices incorporating the formulations presented in example 2 were tested, by comparison with the same formulations containing only methyl undecylenate (MUD) or only the fragrance containing the 1,8-PMT+3-HMA mixture. These tests were carried out in three 3 $m^3$ sensory cabinets, the air quality of which corresponded to the standard ISO-8, having a moisture content of 45-55%, a temperature of 22±3° C. and controlled air pressure and quality (filtration G4 F7). An unpleasant odor (UO) was introduced into each cabinet. It consisted of a mixture of from 5 to 100 ppm of skatole, from 5 to 100 ppm of dimethyl trisulfide, from 5 to 100 ppm of thiogeraniol, from 80 to 4000 ppm of ammonia and from 30 to 600 ppm of isovaleric acid. The time to eliminate the unpleasant odor was evaluated in each case by a trained panel and the average of the results was calculated.

Example 3A: Room Spray

Protocol

A defined amount (1.35±0.03 g) of product (MUD or Fragrance or MUD+Fragrance), then a defined amount of unpleasant odor (3 presses namely 0.174 g to 0.180 g), were sprayed in each of the cabinets. Each panelist smelt the 3 cabinets in turn and evaluated the unpleasant odor UO (on a scale of 0 to 10). This evaluation was carried out every 5 minutes until the unpleasant odor had completely disappeared.

Results

The results obtained are grouped together in Table 3 below.

TABLE 3

| Cabinet | MUD (wt %) | Fragrance (wt %) | UO elimination time (min) |
|---|---|---|---|
| 1 | 0 | 1 | 15 |
| 2 | 0.5 | 0 | 35 |
| 3 | 0.5 | 1 | 7 |

These results show that the constituents of the composition according to the invention make it possible to eliminate the unpleasant odors synergistically and rapidly.

Example 3B: Reed Diffuser

Protocol 3 reed diffusers were prepared the day before the test. For this purpose, 4 reeds of 22 cm were each immersed in a bottle containing 20 g of a deodorizing solution, corresponding respectively to the methyl undecylate solution, to the fragrance solution or to the mixture of the two. Each of the diffusers was placed in a cabinet 20 minutes before the test. To start the test, a defined amount of unpleasant odor was sprayed (3 presses namely 0.174 g to 0.180 g) in each cabinet. Each panelist smelt the 3 cabinets in turn and evaluated the unpleasant odor UO (on a scale of 0 to 10). This evaluation was carried out every 5 minutes until the unpleasant odor had completely disappeared.

Results

The results obtained are grouped together in Table 4 below.

TABLE 4

| Cabinet | MUD (wt %) | Fragrance (wt %) | UO elimination time (min) |
|---|---|---|---|
| 1 | 0 | 8 | 25 |
| 2 | 0.25 | 0 | 15 |
| 3 | 0.25 | 8 | 10 |

These results show that the constituents of the composition according to the invention make it possible to eliminate the unpleasant odors synergistically and rapidly.

Example 3C: Candle

Protocol 3 candles were prepared before the test, which contained respectively either methyl undecylate, or the fragrance or a mixture of the two. Each candle was lit and placed in a different cabinet, after having checked that the wick was around 1.1 to 1.5 cm long. The unpleasant odor (3 presses namely 0.174 g to 0.180 g) was then sprayed in each of the cabinets. Each panelist smelt the 3 cabinets in turn and evaluated the unpleasant odor UO (on a scale of 0 to 10). This evaluation was carried out every 5 minutes until the unpleasant odor had completely disappeared.

Results

The results obtained are grouped together in Table 5 below.

TABLE 5

| Cabinet | MUD (wt %) | Fragrance (wt %) | UO elimination time (min) |
|---|---|---|---|
| 1 | 0 | 2 | 20 |
| 2 | 0.25 | 0 | 25 |
| 3 | 0.25 | 2 | 15 |

These results show that the constituents of the composition according to the invention make it possible to eliminate the unpleasant odors synergistically.

Example 3D: Fabric Spray

Protocol

Three 15×15 cm cotton towels (from CHEEKY® WIPES) were placed on a glass support. Sprayed onto each towel (in the center of the towel), at a distance of 22 cm, were the unpleasant odor and then 2 sprays of solution (0.365 to 390 g) containing 0.25% of capsules respectively containing either methyl undecylenate, or the fragrance, or a mixture of the two. The towels were then placed on an olfactorily neutral surface. The evaluation of the intensity of the unpleasant odor of each towel was carried out after 10 min. An evaluation of the intensity of the unpleasant odor is also carried out after having rubbed each towel 10 times.

Results

The results obtained are grouped together in Table 6 below.

TABLE 6

| Towel | MUD (wt %) | Fragrance (wt %) | UO intensity before rubbing (/10) | UO intensity after rubbing (/10) |
|---|---|---|---|---|
| 1 | 2 | 38 | 6.5 | 0 |
| 2 | 2 | 0 | 6 | 5 |
| 3 | 0 | 38 | 6 | 4 |

These results show that the composition according to the invention makes it possible to completely eliminate the unpleasant odors present on fabrics.

The invention claimed is:

1. A composition containing: (a) 1-para-menthen-8-thiol, (b) 3-mercaptohexyl acetate and (c) methyl undecylenate.

2. The composition according to claim 1, wherein 1-para-menthen-8-thiol and 3-mercaptohexyl acetate are provided by a plant extract or a mixture of plant extracts.

3. The composition according to claim 2, wherein said plant extract is obtained by extraction using supercritical $CO_2$ or by hydrodistillation of a plant part.

4. The composition according to claim 2, wherein the plant extract is an extract of timur (*Zanthoxylum armatum*).

5. The composition according to claim 1, which contains from 100 to 10,000 ppm of 1-para-menthen-8-thiol.

6. The composition according to claim 1, which contains from 100 to 10 000 ppm of 3-mercaptohexyl acetate.

7. The composition according to claim 1, which contains from 0.001% to 10% by weight of undecylenic acid or of a derivative thereof.

8. A method for eliminating unpleasant odors comprising applying the composition according to claim 1 to the body or in domestic, commercial or industrial premises.

9. The method according to claim 8, wherein said composition constitutes an additive added to a detergent product; to a body hygiene product; or to a hair dye product.

10. The method according to claim 8, wherein the composition is applied to the body as a deodorizing product.

11. A deodorizing product comprising a composition according to claim 1 disposed in an aerosol, a candle, a wick, reed or electrical fragrance diffuser, solid polymer material, or a silicone elastomer.

* * * * *